(12) United States Patent
Standaar et al.

(10) Patent No.: US 10,368,686 B2
(45) Date of Patent: Aug. 6, 2019

(54) METHOD FOR TAKING INTO USE AN EXCHANGEABLE SUPPLY PACK IN A BEVERAGE DISPENSING MACHINE AND SYSTEM COMPRISING AN EXCHANGEABLE SUPPLY PACK AND COMPUTER PROGRAM PRODUCT

(71) Applicant: Koninklijke Douwe Egberts B.V., Utrecht (NL)

(72) Inventors: Koen Standaar, Utrecht (NL); Stuart Michael Ruan Jones, Utrecht (NL); Craig Harvey Nelson, Utrecht (NL); Carys Eleri Lloyd, Utrecht (NL); Hendrik Johan Dees, Utrecht (NL); Wouter Plechelmus Bernardus Nijland, Utrecht (NL); Leonardus Henricus Wilhelmus Giesen, Utrecht (NL); Bram Klabbers, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 43 days.

(21) Appl. No.: 15/199,175

(22) Filed: Jun. 30, 2016

(65) Prior Publication Data

US 2016/0309949 A1    Oct. 27, 2016

Related U.S. Application Data

(63) Continuation of application No. PCT/NL2015/050001, filed on Jan. 2, 2015.

(30) Foreign Application Priority Data

Jan. 3, 2014    (NL) ...................................... 2012044

(51) Int. Cl.
A47J 31/40    (2006.01)
B65D 88/54    (2006.01)
(Continued)

(52) U.S. Cl.
CPC ......... *A47J 31/402* (2013.01); *A47J 31/4492* (2013.01); *A47J 31/52* (2013.01)

(58) Field of Classification Search
CPC ...... A47J 31/402; A47J 31/52; A47J 31/4492; A47K 5/1217; B67B 7/28; B67D 1/0007;
(Continued)

(56) References Cited

U.S. PATENT DOCUMENTS 4,520,950 A    6/1985    Jeans
5,464,120 A    11/1995    Alpers et al.
(Continued)

FOREIGN PATENT DOCUMENTS

CN    101128142 A    2/2008
CN    101389564      3/2009
(Continued)

OTHER PUBLICATIONS

International Search Report and Written Opinion for PCT Application No. PCT/NL2015/050001, dated Apr. 29, 2015, 8 pages.
(Continued)

*Primary Examiner* — Charles Cheyney
(74) *Attorney, Agent, or Firm* — Foley & Lardner LLP

(57) ABSTRACT

A method for taking into use an exchangeable supply pack in a beverage dispensing machine is disclosed. The exchangeable supply pack comprising a dosing pump and a container with a liquid substance to be supplied by the beverage dispensing machine. The method subsequently comprises detecting placement of the exchangeable supply pack and executing an activation procedure. The activation procedure comprises repeating an activation cycle while detecting whether or not a liquid substance is present inside the dosing pump. The activation cycle comprises activating the dosing pump during a first period of time and at least partially deactivating the dosing pump during a second
(Continued)

period of time. The activation procedure is completed when it is detected that liquid substance is present in the dosing pump. In addition a beverage dispensing system and a computer program product are disclosed herein.

15 Claims, 15 Drawing Sheets

(51) Int. Cl.
*A47J 31/44* (2006.01)
*A47J 31/52* (2006.01)

(58) Field of Classification Search
CPC .. B67D 1/0079; B67D 1/0021; B67D 1/0888; B67D 1/10; B67D 1/0037; B67D 1/1247
USPC ........... 222/80–91, 47–49, 333, 325, 52, 63, 222/129.1
See application file for complete search history.

(56) References Cited

U.S. PATENT DOCUMENTS

| | | | |
|---|---|---|---|
| 5,588,557 A | 12/1996 | Topar | |
| 5,605,251 A * | 2/1997 | Retti | B05C 5/02 222/1 |
| 5,735,436 A | 4/1998 | Schroeder et al. | |
| 5,836,482 A | 11/1998 | Ophardt et al. | |
| 5,931,343 A | 8/1999 | Topar et al. | |
| 6,092,695 A * | 7/2000 | Loeffler | B01L 3/0296 137/859 |
| 6,234,354 B1 | 5/2001 | Phillips et al. | |
| 6,330,850 B1 | 12/2001 | Rosse | |
| 6,389,962 B1 | 5/2002 | Han et al. | |
| 6,428,689 B1 | 8/2002 | Kameyama et al. | |
| 6,622,064 B2 | 9/2003 | Bartholomew et al. | |
| 6,856,861 B2 | 2/2005 | Dirksing et al. | |
| 6,890,161 B2 | 5/2005 | Paukovits et al. | |
| 7,014,071 B1 | 3/2006 | D'Hond et al. | |
| 7,111,759 B1 | 9/2006 | Gorski et al. | |
| 7,331,483 B2 | 2/2008 | Bhimani et al. | |
| 7,472,805 B2 | 1/2009 | Nighy | |
| 7,648,049 B1 | 1/2010 | Lassota | |
| 7,980,425 B2 * | 7/2011 | Baron | B67D 1/108 137/256 |
| 7,997,448 B1 | 8/2011 | Leyva | |
| 8,070,019 B2 | 12/2011 | Stettes | |
| 8,091,735 B2 | 1/2012 | Girard et al. | |
| 8,224,481 B2 | 7/2012 | Bylsma et al. | |
| 8,322,570 B2 * | 12/2012 | Beavis | A47J 31/36 222/129.1 |
| 8,544,692 B2 * | 10/2013 | Rusch | B67D 1/0004 141/346 |
| 8,870,025 B2 * | 10/2014 | Reddy | F04B 43/1261 222/1 |
| 8,893,927 B2 | 11/2014 | Olson et al. | |
| 8,899,450 B2 * | 12/2014 | Johansson | F04B 17/044 222/333 |
| 8,926,074 B2 | 1/2015 | Morino et al. | |
| 9,469,464 B2 * | 10/2016 | Boehm | B01L 3/0265 |
| 9,648,980 B2 * | 5/2017 | Biewenga | A47J 31/401 |
| 9,957,145 B2 * | 5/2018 | Cohen | B67D 1/0022 |
| 2003/0012849 A1 | 1/2003 | Berson | |
| 2003/0033938 A1 | 2/2003 | Halliday et al. | |
| 2003/0210985 A1 | 11/2003 | Feygin et al. | |
| 2005/0031688 A1 | 2/2005 | Ayala | |
| 2006/0006107 A1 | 1/2006 | Olson et al. | |
| 2006/0278093 A1 | 12/2006 | Biderman et al. | |
| 2007/0164046 A1 | 7/2007 | Nighy | |
| 2008/0149669 A1 | 6/2008 | Nicholson et al. | |
| 2008/0173705 A1 | 7/2008 | Girard et al. | |
| 2008/0283550 A1 | 11/2008 | Nighy et al. | |
| 2009/0007792 A1 | 1/2009 | Glucksman et al. | |
| 2009/0041840 A1 | 2/2009 | Ayala | |
| 2009/0069934 A1 * | 3/2009 | Newman | B67D 1/0021 700/239 |
| 2009/0069949 A1 * | 3/2009 | Carpenter | B67D 1/0021 700/283 |
| 2010/0193544 A1 | 8/2010 | Rusch et al. | |
| 2011/0283888 A1 | 11/2011 | Pozzari et al. | |
| 2011/0285798 A1 | 11/2011 | Matsuo et al. | |
| 2013/0247771 A1 | 9/2013 | Maisch | |
| 2015/0201791 A1 * | 7/2015 | Tinkler | B65D 85/8043 426/431 |

FOREIGN PATENT DOCUMENTS

| | | |
|---|---|---|
| CN | 101790488 A | 7/2010 |
| CN | 101868420 | 10/2010 |
| CN | 102574672 | 7/2012 |
| EP | 0 250 003 | 12/1987 |
| EP | 0 638 486 | 2/1995 |
| EP | 0 749 713 | 12/1996 |
| EP | 1 440 640 | 7/2004 |
| EP | 1 806 314 | 7/2007 |
| EP | 2 085 352 | 8/2009 |
| EP | 2 085 353 | 8/2009 |
| FR | 2672279 | 8/1992 |
| JP | 07-075613 | 3/1995 |
| WO | WO 00/79223 A2 | 12/2000 |
| WO | WO-2009/033106 | 3/2009 |
| WO | WO-2009/106598 A1 | 9/2009 |
| WO | WO 2011/037464 A1 | 3/2011 |

OTHER PUBLICATIONS

International Search Report for International Application No. PCT/US2010/050623, dated Dec. 27, 2010, 3 pages.

\* cited by examiner

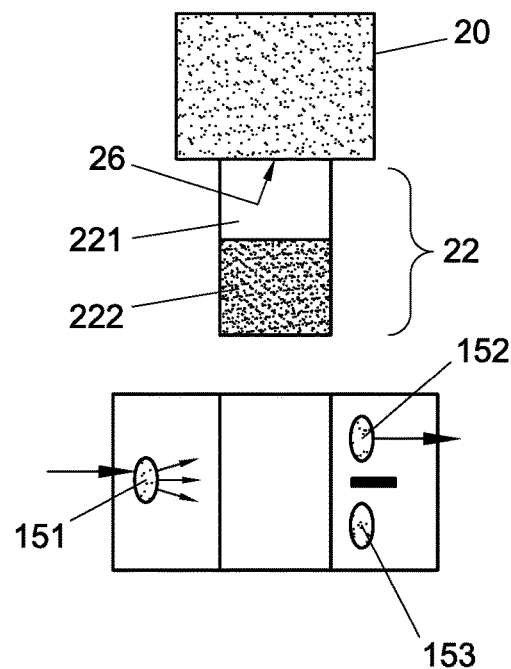 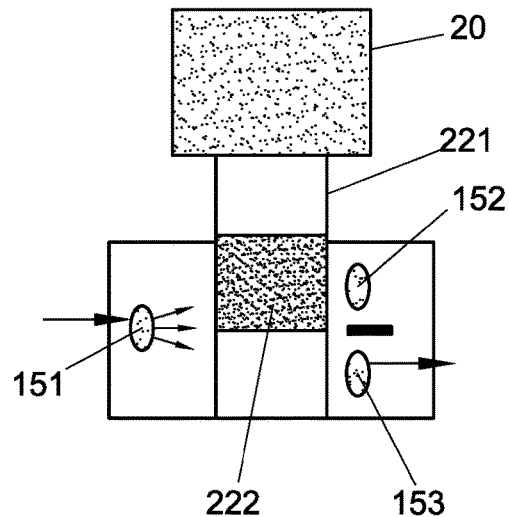
FIG. 7A                FIG. 7B
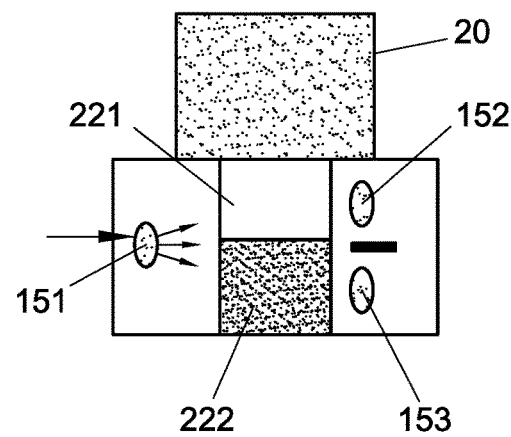 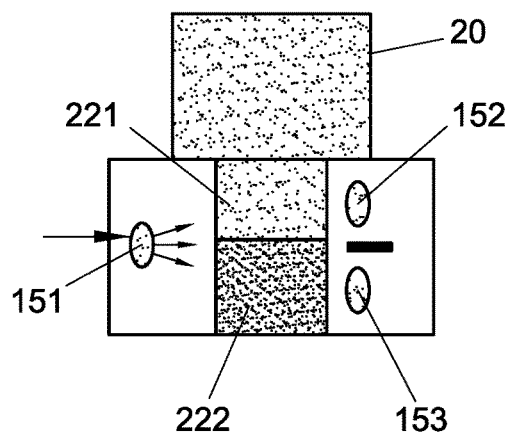
FIG. 7C                FIG. 7D

METHOD FOR TAKING INTO USE AN EXCHANGEABLE SUPPLY PACK IN A BEVERAGE DISPENSING MACHINE AND SYSTEM COMPRISING AN EXCHANGEABLE SUPPLY PACK AND COMPUTER PROGRAM PRODUCT

CROSS-REFERENCE TO RELATED PATENT APPLICATIONS

The present application is a continuation of International Patent Application No. PCT/NL2015/050001, filed on Jan. 2, 2015, which claims priority to Netherlands Patent Application No. 2012044, filed Jan. 3, 2014, all of which are incorporated herein by reference in their entirety.

BACKGROUND

The present invention relates to a method for accessing an exchangeable supply pack in a beverage dispensing machine. The present invention further relates to a beverage dispensing system comprising an exchangeable supply pack and a beverage dispensing machine. The present invention still further relates to a computer program product comprising a program for control of a programmable beverage dispensing system.

It is well known that beverage dispensing machines make use of beverage-related liquid substances that are used in the preparation of a beverage for a user. The liquid substance may include but are not limited to coffee extracts, tea extracts, chocolate beverages, milk, flavors, juices, and/or concentrates thereof. The beverage-related liquid substances are supplied to the dispensing machines in exchangeable supply packs. An example of such an exchangeable supply pack includes a bag-in-box pack. Since a dispensing machine will typically carry a range of exchangeable supply packs a heavily used dispensing machine will need to be frequently re-stocked.

WO2011037464 discloses an exchangeable supply pack and a beverage dispensing system comprising an exchangeable supply pack and a beverage dispensing machine.

The exchangeable supply pack includes a housing, and located within the housing, a container for accommodating a beverage-related liquid substance and a dosing pump (doser); a drive port via which a driving torque may be delivered to the dosing pump; and a liquid outlet port via which the liquid substance may be expelled from the cartridge.

As indicated above, liquid substances accommodated in the container may be one of various kinds having mutually different hydraulic properties. The difference in hydraulic properties in particular influences the bringing into use of a new exchangeable supply pack. In this initial operational mode of the system a first amount of the liquid substance has to be transported from the container into the pump before the new supply pack is suitable for reliable and controlled delivery of the particular liquid substance in a subsequent normal operational mode of the system. During the normal operational mode of the system the liquid substance serves as a coolant for the pump, and additionally as lubricant between mutually moving parts.

During the initial operational mode, wherein a liquid substance is not yet present, heat being developed in the dosing pump resulting from a friction between the mutually moving parts may result in damages of the dosing pump.

SUMMARY

It is an object of the present invention to provide an improved method that at least mitigates the risk of damages.

It is a further object of the present invention to provide an improved system that at least mitigates the risk of damages.

It is a still further object of the present invention to provide a computer program product comprising a program that causes a programmable beverage dispensing system to perform the improved method.

According to a first aspect of the present invention a method for taking into use an exchangeable supply pack in a beverage dispensing machine is provided. The exchangeable supply pack comprises a dosing pump and a container with a liquid substance to be supplied by the beverage dispensing machine. The method subsequently comprises:
  detecting placement of the exchangeable supply pack,
  executing an activation procedure comprising repeating an activation cycle while detecting whether or not a liquid substance is present inside the dosing pump, the activation cycle comprising
    a) activating the dosing pump during a first period of time,
    b) at least partially deactivating the dosing pump during a second period of time,
  the activation procedure being completed when it is detected that liquid substance is present in the dosing pump.

According to a second aspect of the present invention a beverage dispensing system is provided comprising a beverage dispensing machine and at least one exchangeable supply pack comprising a dosing pump and a container with a liquid substance to be supplied by the beverage dispensing machine. The beverage dispensing machine comprises a controller for controlling the dosing pump and an inlet to receive liquid substance to be delivered by the dosing pump from the container.

The beverage dispensing system further comprises a first detection facility arranged to detect presence of liquid substance in the dosing pump and a second detection facility arranged to detect placement of an exchangeable supply package, wherein the controller is coupled to said first and said second detection facility and is operable in at least one of a start-up mode and a subsequent normal operation mode. The controller is arranged to assume the start-up mode in response to a signal from the second detection facility indicating that a new exchangeable supply package is placed. In the start-up mode the system is arranged to perform an activation procedure wherein an activation cycle is repeated comprising activating the dosing pump during a first period of time and subsequently maintaining the pump in an at least partially deactivated state during a second period of time. Upon detection by the first detection facility that liquid substance is present within the dosing pump the controller is arranged to complete the start-up mode.

According to a third aspect of the present invention a computer program product is provided that comprises a computer program for execution by a controller of a beverage dispensing system that further comprises a beverage dispensing machine and at least one exchangeable supply pack comprising a dosing pump and a container with a liquid substance to be supplied by the beverage dispensing machine.

The activation procedure in the method and system according to the present invention can have a longer or shorter duration, dependent on the type of liquid substance present in the container. By performing the activation procedure as a repeating activation cycle, wherein the pump is maintained in a deactivated state during a second period of time, heat development in the dosing pump is moderated, therewith avoiding damages to the dosing pump even in cases where the liquid substance needs more time to access the dosing pump, for example due to a relatively high viscosity of the liquid substance.

The present invention is particularly valuable for application in a method wherein the activation procedure is preceded by a step of broaching the container to provide a channel for said liquid substance between the container and the dosing pump. Before execution of the broaching step no liquid substance is present yet in the dosing pump and even if a channel is provided the broaching step may not immediately result in a flow of liquid substance towards the dosing pump due to presence of air or an inert gas inside the dosing pump.

A broaching step may be performed manually by the operator, but preferably the exchangeable supply pack includes a piercing element to perform said broaching step. In an embodiment the exchangeable supply pack comprises a conduit from the container to the pump having the piercing element rotatable arranged therein. In this embodiment the piercing element has tooth shaped elements facing the container to perform the broaching step. The rotatable piercing element has an outer profile that cooperates with an inner profile of the conduit to define an axial position of said rotatable piercing element dependent on its angular position. The rotatable piercing element at least has a first state wherein it is angularly coupled to a rotatable element of said dosing pump. This is advantageous in that the same driving means that are used to drive the dosing pump during normal operation can be used to cause the piercing element to broach the exchangeable supply pack.

In an embodiment the rotatable piercing element has a second state wherein it is decoupled from the rotatable element by which it is driven during the broaching step. In this way it is avoided that the piercing element generates noises during normal operation of the beverage dispensing system.

Placement of a new exchangeable supply pack may be facilitated in an embodiment wherein the dosing pump includes a driven pump pinion for receiving a driving shaft of the beverage dispensing machine and wherein said broaching the container is preceded by an adaptation procedure to facilitate mechanically coupling said pinion to said driving shaft, said adaptation procedure comprising alternately rotating said driving shaft forward and backward. This adaptation procedure enables engagement between the driven pump pinion and the driving shaft without requiring human intervention.

In an embodiment the activation procedure further comprises detecting if an interrupt condition occurs and interrupting the activation procedure upon such detection. Possible interrupt conditions include one or more of a duration of said start-up mode exceeding a predetermined duration and a number of times that said activation cycle is repeated exceeding a predetermined number of times.

In the exceptional case that no liquid enters the dosing pump, for example by a failure during the broaching procedure or a defect of the dosing pump, the activation procedure is automatically interrupted. Therewith it is avoided that an operator has to determine at which moment it is likely that an error has occurred and has to manually interrupt the activation procedure.

BRIEF DESCRIPTION OF THE DRAWINGS

These and other aspects are described in more detail with reference to the drawing. Therein:

FIG. 11A illustrates a situation wherein no liquid is detected, and FIG. 11B illustrates a situation wherein a liquid is detected.

DETAILED DESCRIPTION OF EMBODIMENTS

Like reference symbols in the various drawings indicate like elements unless otherwise indicated.

Figure 1:
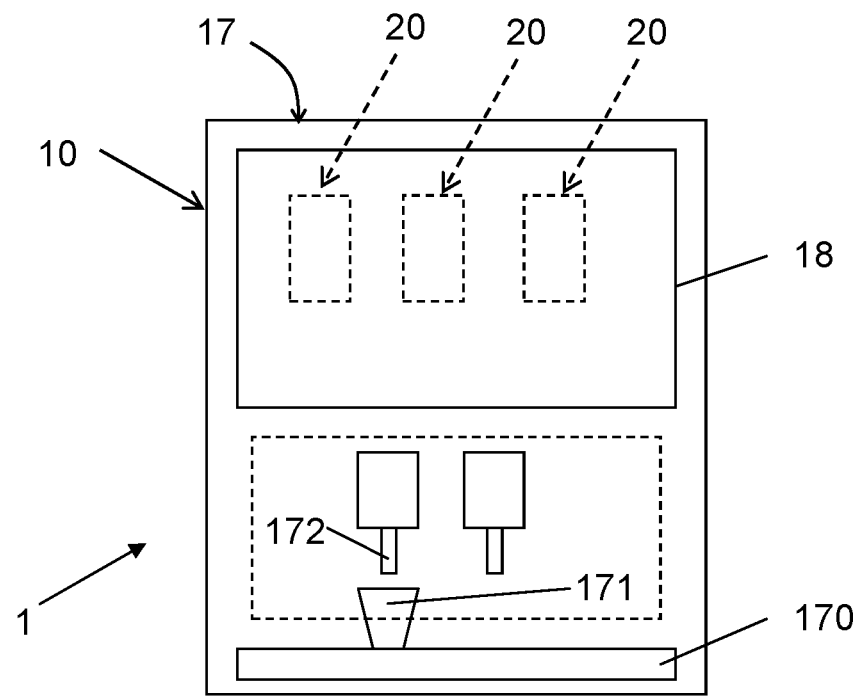
FIG. 1 schematically shows an embodiment of a beverage dispensing system according to the present invention, comprising a beverage dispensing machine with exchangeable supply packs.

FIG. 1 schematically shows a beverage dispensing system 1. The system 1 comprises a beverage dispensing machine 10 and at least one exchangeable supply pack. In the embodiment of FIG. 1, the system includes three such exchangeable supply packs 20, indicated by dashed lines, inside its housing 17.

As shown in FIG. 1 a touch-screen display 18 is mounted on the housing 17 for allowing an operator to specify a beverage to be prepared and dispensed. The housing 17, furthermore, has support 170 for supporting one or more receptacles 171. Outlets 172 are provided for dispensing a prepared beverage. A receptacle 171 may be placed for example, by the operator by a placing mechanism.

Figure 2:
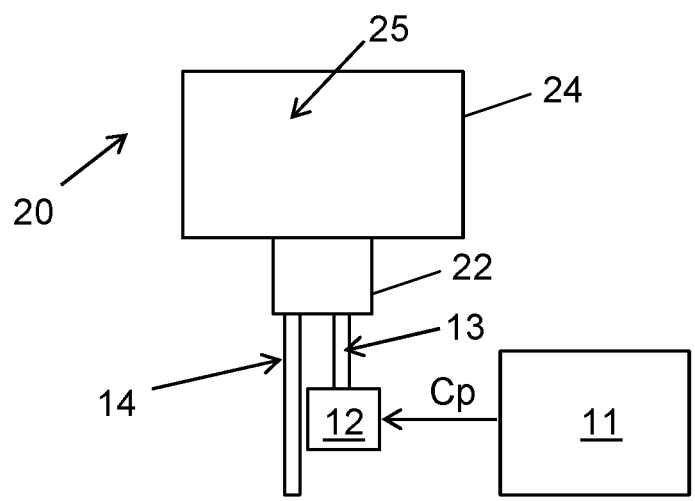
FIG. 2 shows parts of an exchangeable supply pack and the beverage dispensing machine in more detail.

An example of an exchangeable supply pack 20 is shown in more detail in FIG. 2. The exchangeable supply pack 20 comprises a dosing pump 22 and a container 24 with a liquid substance 25 to be supplied by the beverage dispensing machine. The liquid substance 25 is for example a coffee extract, a tea extract, a chocolate beverage, milk, flavours, juices, or a concentrate for the preparation of these beverages. The beverage dispensing machine 10 may process the liquid substance and/or mix the liquid substance with other liquid substances. Alternatively the liquid substance may be supplied in the form in which it is present in the package, for example a cold chocolate beverage.

The dosing pump 22 is for example a volumetric pump, for example a gear pump, having a pair of gears that engage each other.

As can be seen in FIG. 2, the beverage dispensing machine comprises a controller 11 for controlling the dosing pump 22 of the exchangeable supply pack, and an inlet 14 to receive liquid substance to be delivered by the dosing pump from the container 24. In the embodiment shown in FIG. 2, the beverage dispensing machine further comprises a motor 12, that is controlled by drive signal Cp and that is arranged for driving the dosing pump 22 via a drive shaft 13. In a variant the pump is magnetically coupled with the dosing pump. Alternatively a motor for driving the dosing pump 22 may be integrated in the dosing pump. In that case the dosing pump may be coupled by electric contacts to the controller 11 to receive the drive signal Cp. Alternatively the drive signal CP may be transferred in a contactless manner between the controller and an integrated motor, for example by a capacitive or inductive coupling. In again another embodiment the motor may have a rotor part integrated in the dosing pump 22 and a stator part arranged outside the dosing pump as a part of the beverage dispensing machine 10.

Figure 3:
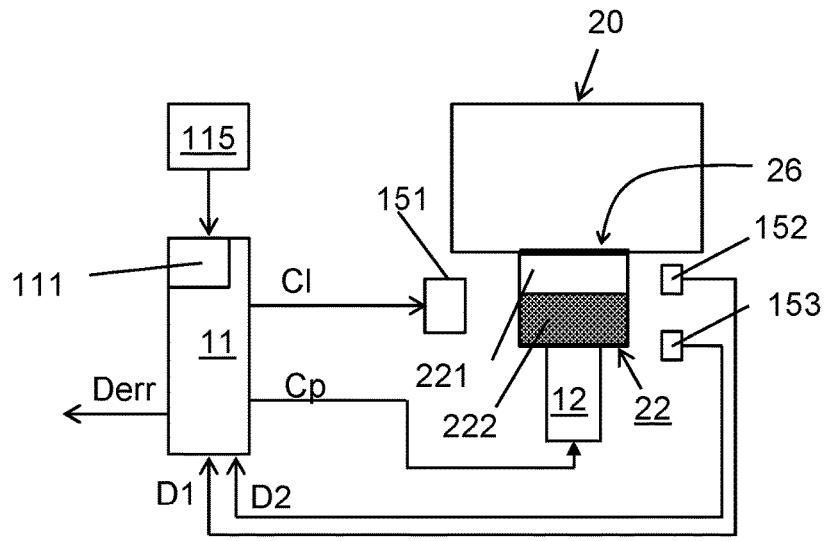
FIG. 3 shows other parts of an exchangeable supply pack and the beverage dispensing machine in more detail, FIG. 4 provides another schematical illustration of an embodiment of a beverage dispensing system according to the present invention, comprising a beverage dispensing machine with exchangeable supply packs, FIG. 5 schematically illustrates an embodiment of a method according to the present invention.

The beverage dispensing system comprises a first detection facility arranged to detect presence of liquid substance in the dosing pump and a second detection facility that is arranged to detect placement of an exchangeable supply package. The controller 11 is coupled to these detection facilities. The first detection facility may include a pair of electrical contacts inside the pump house. The presence of a liquid inside the pump house is detectable by an increased electrical conductivity between the electrical contacts. In the embodiment shown in FIG. 3, the first detection facility includes a transmitter 151 for emitting radiation and a first detector 152 for detecting radiation. The exchangeable supply pack 20 includes a first substantially transparent element 221 which in use is positioned between the transmitter 151 and the first detector 152.

Also various implementations of the second detection facility are possible. The second detection facility may for example be an input of the controller that allows an operator to signal that a new exchangeable supply package is placed. Alternatively, the second detection facility may include a mechanical switch that senses placement of a new exchangeable supply package. Preferably however, the second detection facility is implemented in a non-mechanical manner. In the embodiment shown in FIG. 3, the second detection facility includes a transmitter 151 (in this case the same transmitter as used in the first detection facility) for emitting radiation and a second detector 153 for detecting radiation. The exchangeable supply package 20 at least has an opaque portion 222 that blocks transmission of radiation from the transmitter 151 to the second detector 153 when the exchangeable supply package 20 is placed in the beverage dispensing machine. In the absence of an exchangeable supply package 20, at least part of the emitted radiation reaches the second detector 153.

When taking into use a new exchangeable supply pack 20, no liquid substance is present yet in the dosing pump that could assist in conducting away heat developed by mutually moving parts. Typically also heat development is higher than during normal use as the liquid substance cannot serve as a lubricant.

In the embodiment shown the controller 11 is coupled to a storage medium 115, forming a computer program product that is executed by the controller. Alternatively, the controller 11 may be provided as dedicated hardware having predefined functionality.

In the beverage dispensing system according to the present invention the controller 11 is operable in at least one of a start-up mode M1 and a subsequent normal operation mode M2. The controller is arranged to assume the start-up mode in response to a signal D2 from the second detection facility issued by the second detector 153 indicating that a new exchangeable supply package 20 is placed. In the start-up mode M1 the system is arranged to repeat an activation cycle AC that comprises activating the dosing pump 22 during a first period of time and subsequently maintaining the pump in a deactivated state during a second period of time. Alternatively, the pump may be only partially deactivated during this second period of time, e.g. by operating the pump at a lower power than during the first period. In any case the duration of the first period, the duration of the second period and the power levels during the first and the second period are selected to restrict heat development inside the pump to an acceptable level even in the absence of liquid substance from the container.

Upon detection by the first detection facility as indicated by signal D1 from the first detector 152 that liquid substance is present within the dosing pump 22, the controller 11 is arranged to leave the start-up mode M1. When leaving the start-up mode the controller may immediately assume the normal operation mode M2. Alternatively, the controller may first assume an intermediary operational mode M12 before assuming the normal operation mode.

In the embodiment shown, the controller 11 has a detection facility 111 to detect if a duration of the start-up mode M1 exceeds a predetermined duration. Alternatively, or additionally, the controller 11 may have a detection facility 111 to detect if a number of times that said activation cycle is repeated exceeds a predetermined number of times. Upon detection that the duration exceeds said predetermined duration and/or that a number of times that said activation cycle is repeated exceeds a predetermined number of times the controller issues a detection signal Derr. In addition the controller 11 may assume an error mode M3. In this way it is prevented that the activation cycle is endlessly repeated in the exceptional case that the exchangeable supply package 20 is not properly opened.

Figure 4:
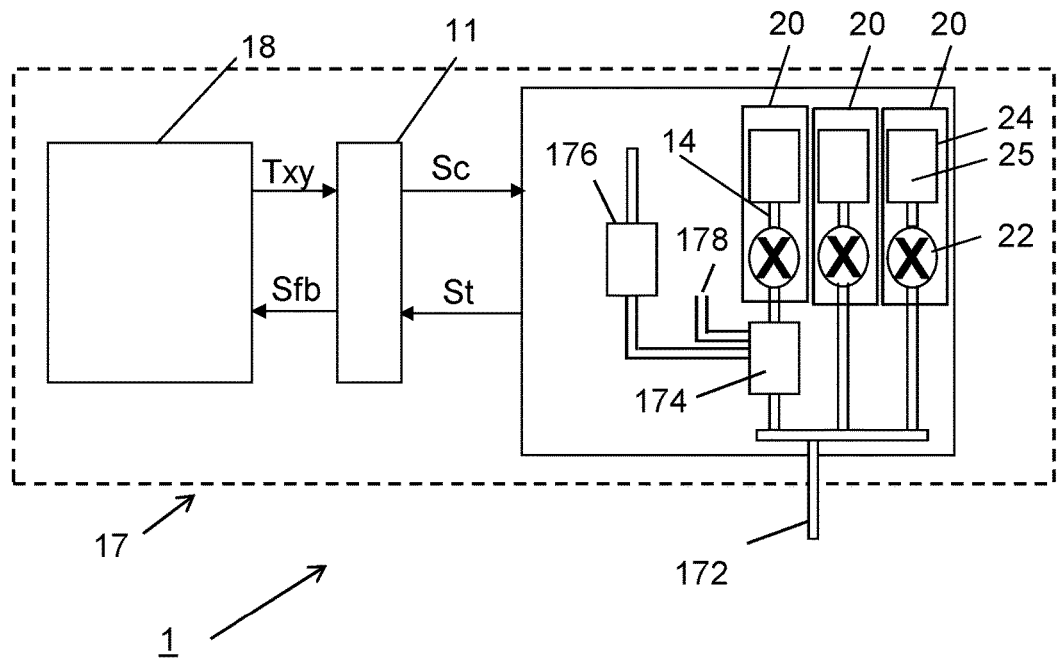

FIG. 4 schematically shows an embodiment of the beverage dispensing system 1 comprising a beverage dispensing machine and three exchangeable supply packs 20. Parts therein corresponding to those in FIGS. 1, 2 and 3 have the same reference number. Additionally the embodiment of the beverage dispensing system 1 of FIG. 4 comprises a water jet mixer 174 for mixing a liquid substance from one of the containers with water heated by heater 176 and air provided by air conduit 178. Alternatively, a water jet mixer is provided in the beverage dispensing machine for each exchangeable supply pack. In the embodiment shown the beverage dispensing machine includes a touch screen 18 that is coupled to the controller. The touch screen 18 provides output signals Txy to the controller 11 that are indicative for user control acts and the controller 11 drives the touch screen 18 with signals Sfb to provide the user with visual feedback and to indicate available options. Alternatively or in addition other input means may be provided to allow the user to control the beverage dispensing machine, e.g. means to receive voice input and/or mechanical means for manual control. Likewise other output means may be provided as an alternative or in addition to provide the user with feedback and to indicate available options, e.g. an auditory output.

The controller 11 provides control signals Sc to control operation of the beverage preparation system, e.g. control signals Cp to control the dosing pumps 22 and optional other elements, such as the heating device 176. The controller receives status signals St, such as the output signals of the first and the second detector 152, 153.

Figure 5:
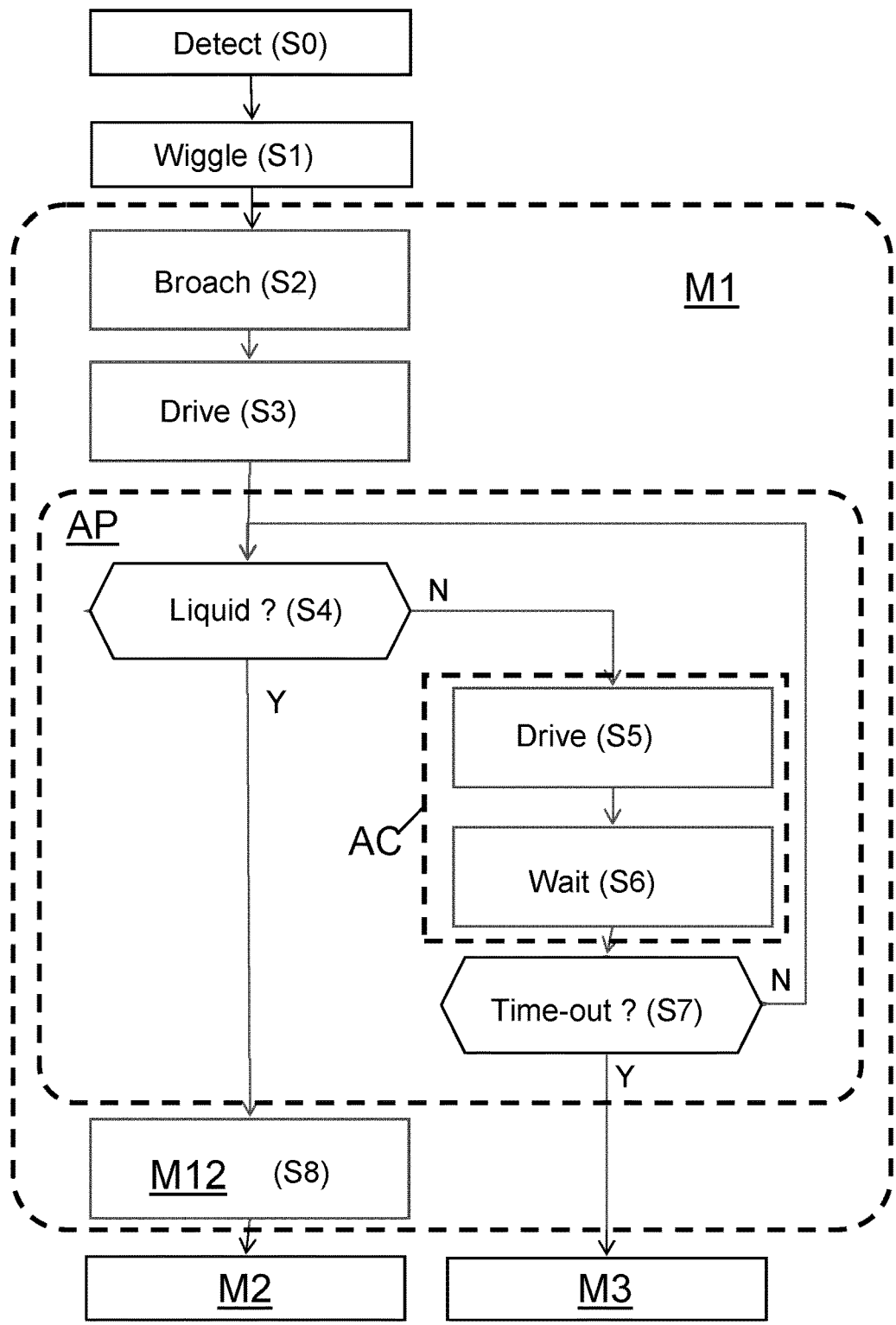
Figure 6:
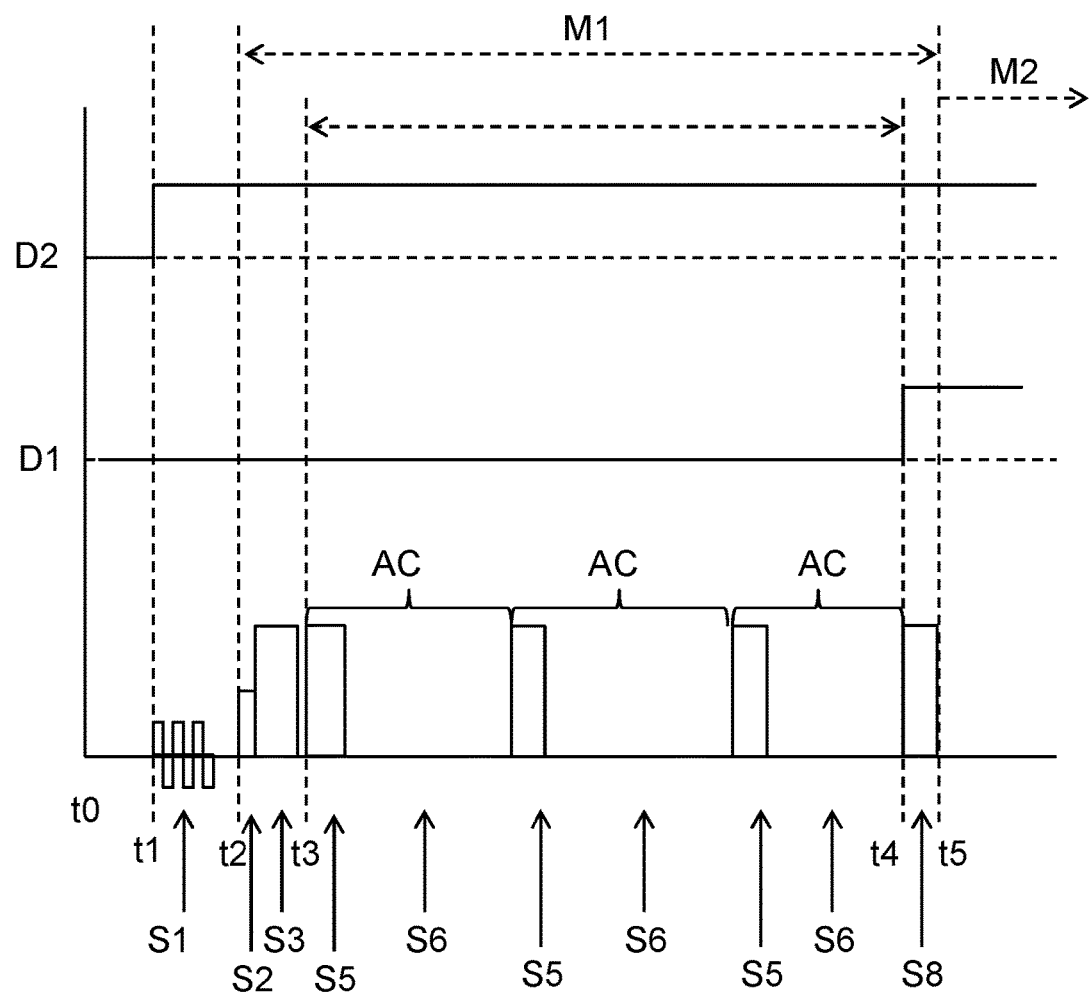
FIG. 6 illustrates an exemplary sequence of events in an embodiment of a method according to the present invention, FIGS. 7A to 7D schematically illustrate placement of an exchangeable supply pack, FIG. 8 schematically illustrates an optional step in an embodiment of a method according to the present invention.

FIGS. 5 and 6 illustrate a method according to the present invention. Therein FIG. 5 is a flowchart illustrating possible steps of the method and FIG. 6 is a time diagram, illustrating an exemplary sequence of events. In this example it is presumed that the operator places an exchangeable supply pack 20 in the beverage dispensing machine at time t1. In response thereto the second detection facility provides a signal indicative for this event, by raising the signal level D2.

In response thereto the controller performs a first step S1 that initiates a wiggling motion of the drive shaft 13 that is provided to drive the dosing pump 22. I.e. in this step the drive shaft 13 is rotated alternately in a forward and a backward direction over a relatively small angle, e.g. by around +/−40 degrees. This wiggling motion simplifies engagement between a profile of the drive shaft 13 and a complimentary profile of a rotatable element of the dosing pump. For this purpose, the rotational speed during this wiggling motion is relatively low, e.g. in the order of 10 to 20 rpm. It may be presumed that the mutually complimentary profiles of the drive shaft 13 and the rotatable element are engaged after continuing the wiggling motion during a predetermined amount of time. Alternatively a detection means may be present to detect if engagement is achieved. In embodiments the step S1 may be skipped, for example in embodiments wherein the engagement is achieved manually, or wherein the exchangeable supply pack 20 is provided with the complimentary profile of the rotatable element of the dosing pump in a standard orientation that matches a default standard orientation of the drive shaft. Also the step S1 is superfluous if the motor is integrated with the dosing pump, or if the motor and the dosing pump are coupled in a contactless manner.

Upon expiry of the predetermined amount of time or upon detection of engagement, in this example at t2, the controller 11 assumes the start-up mode M1. In this example the start-up mode M1 starts with a broaching step S2. In this step S2 a piercing element is driven through a seal 26 that seals a channel from the container 24 to the pump. Alternatively the seal may be pierced manually.

Subsequently the dosing pump is driven in step S3 to create a vacuum to allow liquid substance 25 to flow from the container 24 towards the dosing pump 22.

In the start-up mode M1 the system is arranged to repeat an activation cycle AC. The activation cycle comprising activating the dosing pump 22 during a first period of time in step S5 and subsequently maintaining the pump in an at least partially deactivated state during a second period of time in step S6. By way of example step S5 involves driving the motor for 10 revolutions at a speed of 600 rpm, while in step S6 the motor is full deactivated during 5 seconds. Alternatively, step S6 may comprise driving the motor at a lower speed, but for a longer duration than the duration of a full deactivation. A full deactivation is preferred as it simplifies control and best enables the dosing pump 22 to cool down. In the embodiment shown it is detected in step S4 at the start of the first activation cycle and subsequent to each step S6 if liquid substance is present in the dosing pump 22. Alternatively this detection may take place subsequent to step S5 and before step S6. In practice this detection may take place continuously while performing the activation cycle AC. Upon detection (Y) of liquid substance inside the pump the activation cycle is no longer repeated and the system is arranged to assume a subsequent operational mode. If no liquid substance is detected (N), the activation cycle AC is repeated. In this example it is detected at time t4 during the third activation cycle that a liquid substance is present in the dosing pump. This has the effect that the third activation cycle is interrupted, therewith completing activation mode M1. The system assumes an intermediary mode of operation M12. Therein the dosing pump 22 is activated to buffer an amount of liquid substance. Subsequently, at time t5 the system assumes the normal operation mode M2. By buffering an amount of liquid substance outside the container 24 the system can still provide a beverage containing the liquid substance at the moment it is detected during normal use that the container 24 runs empty. The first detection facility may be used for this detection. Alternatively, the dosing pump may have an internal space having a volume that is more than sufficient for a complete beverage and the first detection facility may be arranged to indicate the condition that the internal space is not completely filled, for example by detecting the presence of liquid substance at the highest level within the internal space. Alternatively, or in addition the system may pass through other intermediary modes of operation, before assuming normal operational mode, for example to perform a self diagnosis or to execute a warming-up procedure. Alternatively, upon completion of the activation mode M1, the system may directly assume the normal operational mode M2, wherein it is ready to dispense beverages upon control instructions by the operator.

The flowchart of FIG. 5 also shows a step S7. In this step it is detected if a condition (Y) occurs that indicates that the activation procedure AP fails for some reason. If this is the case the controller 11 assumes an error mode M3. In this mode M3, the operator may be signaled that an error occurred during the start-up mode M1. If no such condition occurs, the activation cycle AC is allowed to repeat. A possible interrupt condition is a duration of the start-up mode M1 that exceeds a predetermined duration. Another possible interrupt condition is the situation wherein a number of times that said activation cycle is repeated exceeds a predetermined number of times. In the embodiment shown the detection of step S7 takes place subsequent to step S6, wherein the dosing pump 22 is (at least partially) deactivated. More in particular the controller counts the number of times that the activation cycle AC is repeated and assumes the error mode if said number exceeds a predetermined number of times (for example 10 times). Alternatively, this detection may take place in another phase during the activation cycle. By way of example the controller 11 may be provided with a timer 111 that is started at the onset of the activation mode M1 and that is stopped at completion of the activation mode, wherein a timer value exceeding a predetermined value (for example 1 minute) is a failure condition.

FIGS. 7A to 7D show various stages occurring when taking into use a new exchangeable supply pack 20. The dosing pump 22 with its first transparent part 221 and its second opaque part 222 acts here as a second or pack interface for cooperating with a first, or machine interface formed by the transmitter 151 and the detectors 152 and 153.

In FIG. 7A a situation is depicted that a full exchangeable supply pack 20 comprising a dosing pump 22 is not yet received between the transmitter 151 and the first and second detectors 152 and 153. Each of the first and second detectors is now exposed to the unobstructed radiation of the transmitter 151. This is characteristic for a situation that no pack 20 is present.

In FIG. 7B a full exchangeable supply pack 20 is shown whereby the dosing pump 22 of the supply pack 20 is partly inserted between the transmitter 151 and the first detector 152. When the first detector 152, as shown in FIG. 7B, does not detect any radiation from the transmitter and when at the same time the second detector 153 detects the unobstructed radiation from the transmitter 151, then it can be determined that the pack 20 is not (yet) correctly inserted.

In FIG. 7C it is shown that the full pack 20 is properly inserted, with the upper part 221 facing the first detector 152 and the lower part 222 facing the second detector 153. In this case the pack 20 is full and thus filled with a liquid product. Presuming that the pack 20 is sealed, no liquid substance 25 from the container 24 in the package will be present yet in the dosing pump 22. Accordingly the first detector 152 still detects the substantially unobstructed radiation from the transmitter 151. Detection of a liquid substance in the dosing pump in this stage indicates an error, for example a defect seal. In response to a detection of this condition the controller 11 may assume the error mode M3 and the controller may use the user interface to signal this to the operator. If this error condition is not detected, the controller 11 proceeds with the next step S2, i.e. broaching the pack and subsequently attempts to pump liquid substance from the container 24 in the dosing pump 22. Once this is successful the liquid substance fills the dosing pump 22 resulting in the situation depicted in FIG. 7D. Now radiation from the transmitter 151 is at least partly obstructed by the liquid substance in the dosing pump and this is detected and signaled to the controller by the first detector 152. Presuming that the detectors 152, 153 provide respective binary signals D1, D2 wherein 1 indicates the amount of received radiation is higher than a proper threshold level (which may be mutually different for these detectors) and 0 indicates the amount of received radiation is lower than the proper threshold level the following situations may occur.

| D1 | D2 | Situation |
|----|----|-----------|
| 0  | 0  | Pack is properly placed and dosing pump is filled. (FIG. 7D) Before step S2 this may indicate a leaking seal. |
| 0  | 1  | Pack is partly, but not yet properly placed. (FIG. 7B) |
| 1  | 0  | Pack is properly placed, and dosing pump is empty. (FIG. 7C) |
| 1  | 1  | No pack is placed (FIG. 7A) |

Figure 8:
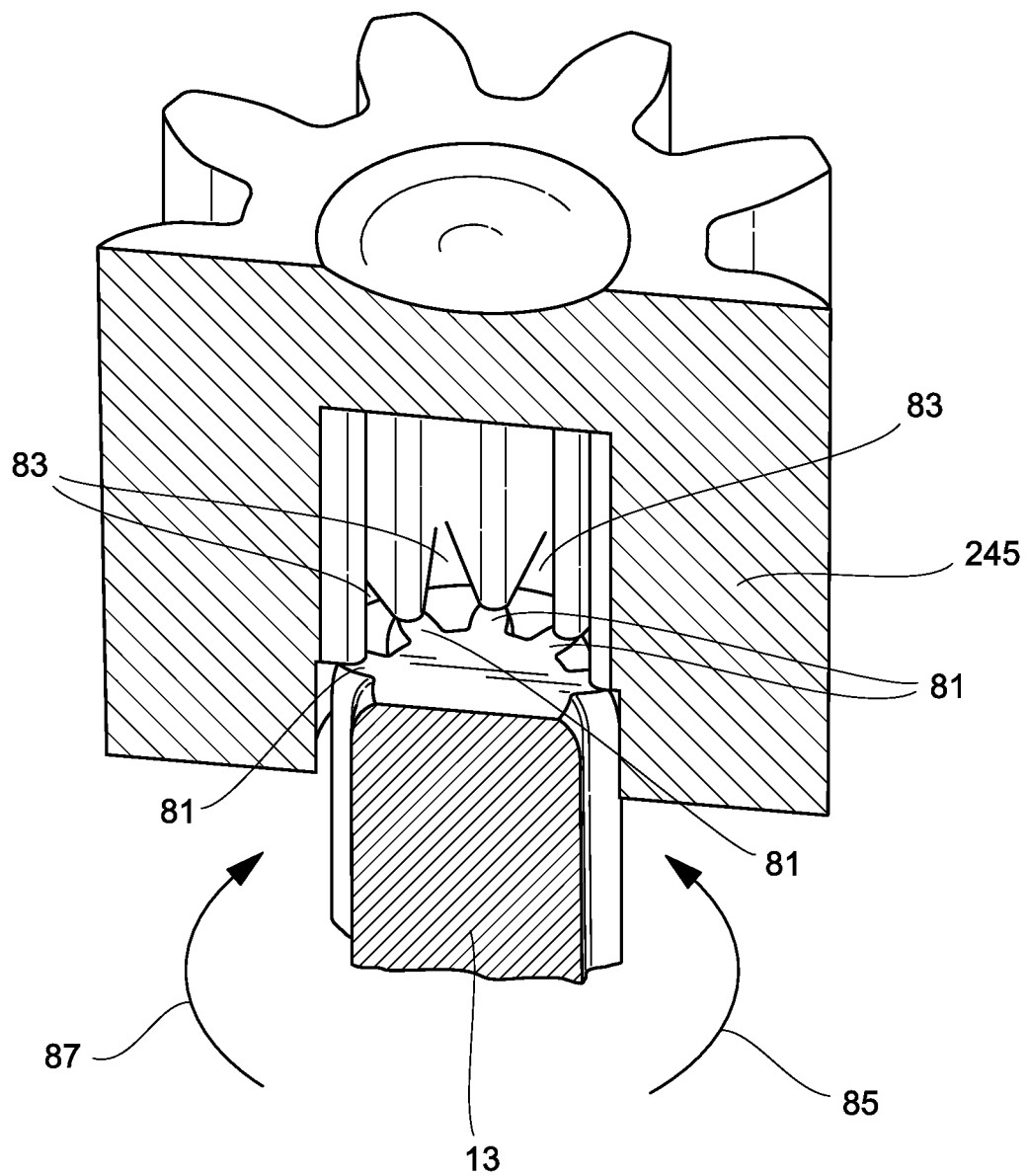

FIG. 8 illustrates an optional additional feature to facilitate placement of a new pack 20 in the beverage dispensing machine. As the pack 20 is placed into the beverage dispensing machine a splined drive shaft 13 of the dispenser pump drive 12 must engage with pinion 245 of the pump mechanism of the dosing pump 22. A problem can be defined in that a driven member, such as the pinion 245 of the gear pump, has to be pressed into engagement with the splined shaft 13 that will be driving the pinion 245. Both driving shaft 13 and pinion 245 have a moderate amount of friction. When the splines 81 of the splined shaft 13 are not in line with mating formations 83 on the pinion 245 a solution is needed to align both without damaging the splines 81 or mating formations 83 of either part. This engagement is made easier if the drive shaft 13 is oscillating backwards and forwards by around +/−40 degrees, in accordance with arrows 85, 87 indicated in FIG. 8. According to a proposed solution the first detector 152 detects when the pinion 245 is getting close to the drive shaft 13 and when this is the case, the drive shaft 79 is wiggled slightly for a few degrees. This lasts a second after the first detector 152 detects the presence of the pinion 245 by means of the second substantially opaque element 222. The chosen solution for simplifying the engagement between driving and driven members 13, 245 is effective without human attention. This engagement is more readily achieved if the drive shaft 13 is rotated back and forth by a few degrees as the driven member 245 of the dosing pump 22 engages the relevant splines 81. This oscillating rotation performed in step S1 of the embodiment of the method described with reference to FIG. 5 is referred to above as 'wiggling'.

In the example presented above, it is presumed that the liquid substance contained in the container 24 of the exchangeable supply pack 20 is opaque, so that its presence in the dosing pump can be detected by monitoring transmission of radiation through the transparent part 221 of the dosing pump. Another embodiment is described in the sequel that is also suitable for transparent liquid substances.

Figure 9:
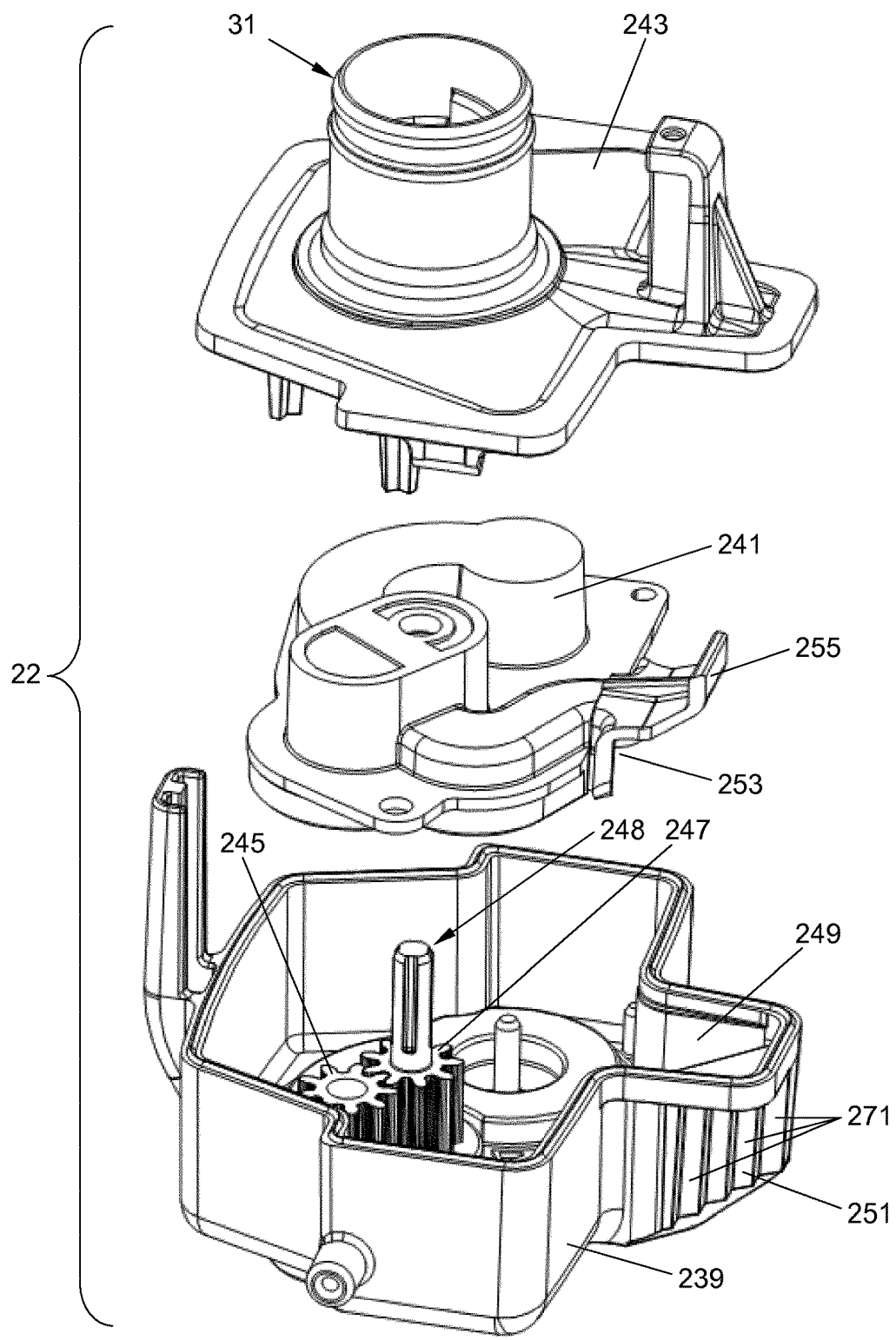
FIG. 9 illustrates an exploded view of a dosing pump in an embodiment of the system according to the present invention.

FIG. 9 shows an exploded view of this dosing pump 22 in this embodiment. A first substantially transparent element 249 can be seen protruding from the right hand side of the dosing pump 22. A stepped/serrated feature 251 provides an optical element of the system, as will be explained below. The dosing pump further includes a bottom housing 239, a pump housing 241, and a top cap 243. The bottom housing 239 is the main housing of the dosing pump 22. The pump accommodated in the pump housing 241 is a gear pump with a pair of mutually engaging gear pinions 245, 247. One of the gear pinions 245, 247 of the pair is arranged for coupling to the drive shaft 13 of the beverage dispensing machine.

The pump housing 241 provides the body of the gear pump and both an inlet and outlet orifices for the pump. In the specific embodiment, as described here an extension 255 in the liquid flow path 253 can be seen on the right hand side of the pump housing 241. This extension 255 functions as a flow diverter. This flow diverter 255 ensures that product drawn into the pump passes through the first substantially transparent element, in the present FIG. 9 sample chamber 249, and hence through the field of view of an optical system to be described below. It should be understood however that the flow diverter is an optional element not essential to the operation of the optical system.

The top cap 243 mounts to the bottom housing 239. The top cap 243 is used for attachment of the dosing pump 22 to a container 24 (not shown, but conventional) provided as part of an exchangeable supply pack 20.

Figure 10:
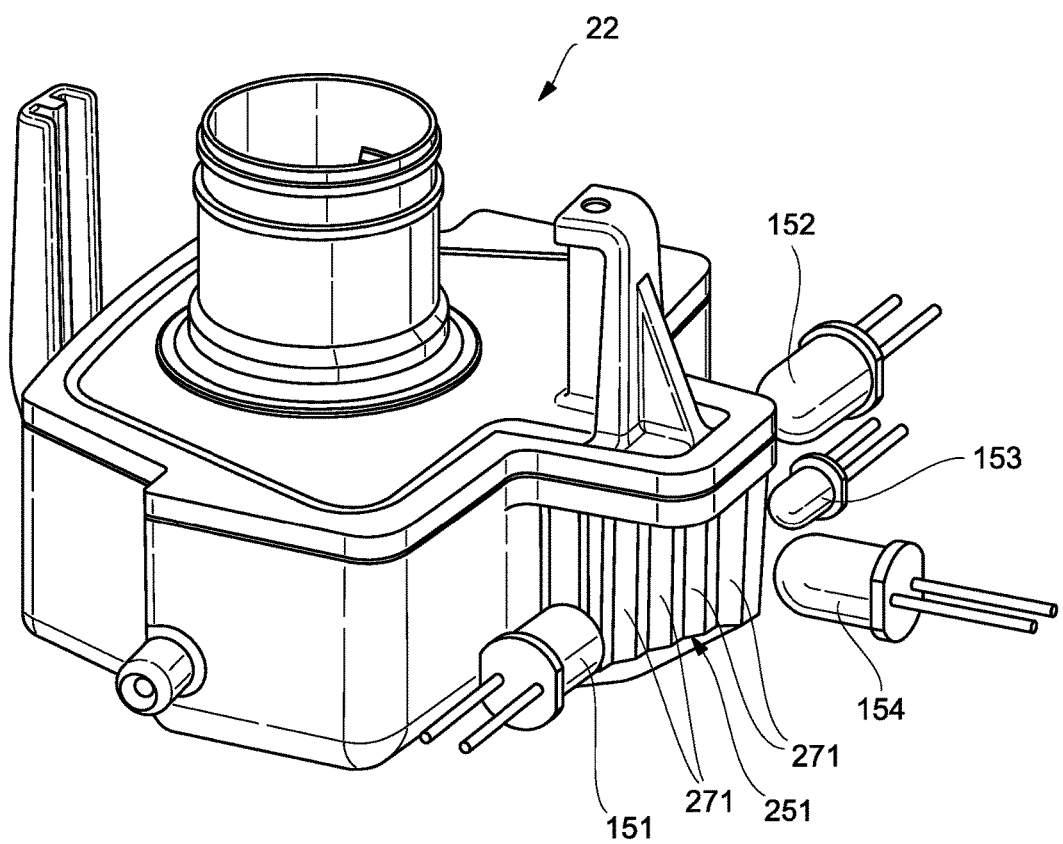
FIG. 10 illustrates a perspective view of the dosing pump of FIG. 9.

FIG. 10 shows the dosing pump 22 of FIG. 9 in assembled condition and in position with respect to a detection arrangement formed by a transmitter 151 and a first, a second and a third detector 152, 153, 154.

Figure 11A:
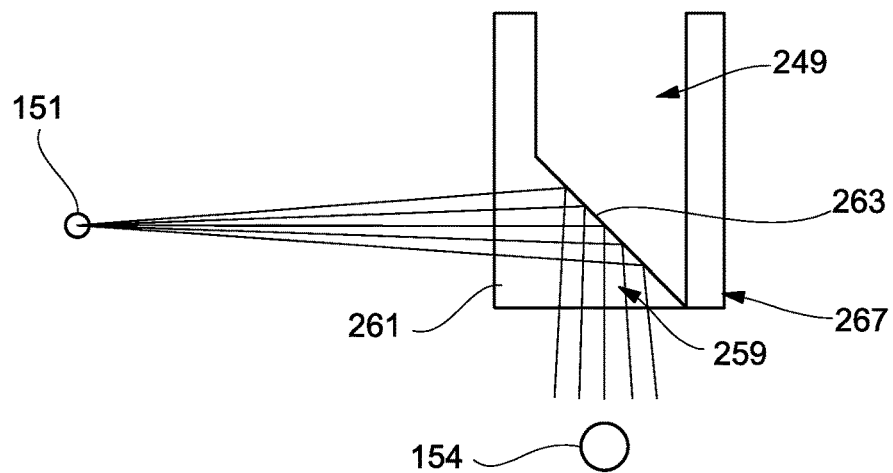
FIGS. 11A and 11B illustrates a step of detecting a liquid substance in the dosing pump, Therein
Figure 11B:
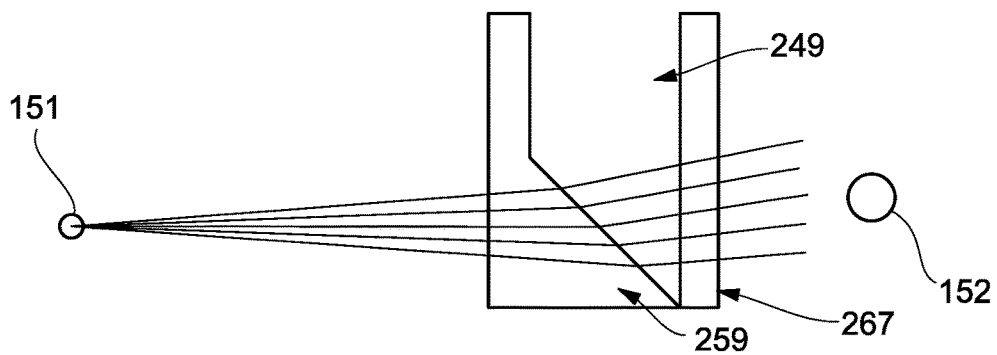

In FIGS. 11A, 11B it can be seen that light from the external light source 151 is directed towards a prism 259 that forms a part of the sample chamber 249. Here the prism 259 acts as an optical element, which can be an element in any shape or form that makes use of difference in refractive index of fluids and air. It is only required that such an optical element can be utilised to alter a direction of light falling onto this optical element. The light from the light source 151 passes through an external wall 261, but is reflected from an internal inside wall 263 when no liquid is present yet in the sample chamber 249 (see FIG. 11A), or at the end of life of the pack 20, when all liquid substance is used. The reflected light then exits the prism 259 where it is detected by a third detector, e.g. a reflection sensor 154.

The presence of a liquid in the sample chamber 249 (see FIG. 13B) changes the refractive index at the internal inside wall 263 causing the light to continue into the liquid instead of being reflected. Light emerging from a far chamber wall 267 is detected by a first detector, e.g. transmission sensor 152.

Figure 11C:
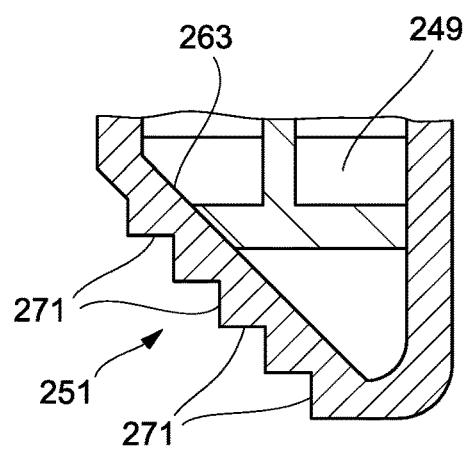
FIG. 11C illustrates a detail of the dosing pump of FIG. 9.

To reduce cost and improve manufacturability the solid prism 259 of the schematic FIGS. 11 (A and B) is replaced by a series of smaller plurality of prism facets 271 shown in FIG. 11C. In the embodiment described the prism facets 271 form the stepped serrated feature 251 at an exterior of the inside wall 263 of the sample chamber 249. In other conceivable examples the whole housing of the dosing pump 22 might be used as the sample chamber and the prism facets could be incorporated into the housing side wall.

Presuming that the detectors 152, 154 provide respective binary signals D1, D2 wherein 1 indicates the amount of received radiation is higher than a proper threshold level (which may be mutually different for these detectors) and 0 indicates the amount of received radiation is lower than the proper threshold level the following situations may occur.

| D1 | D2 | Situation |
|---|---|---|
| 0 | 0 | An opaque liquid is present in the sample chamber 249 |
| 0 | 1 | No liquid is present in the sample chamber 249 |
| 1 | 0 | A transparent liquid is present in the sample chamber 249 |
| 1 | 1 | NA |

Figure 12:
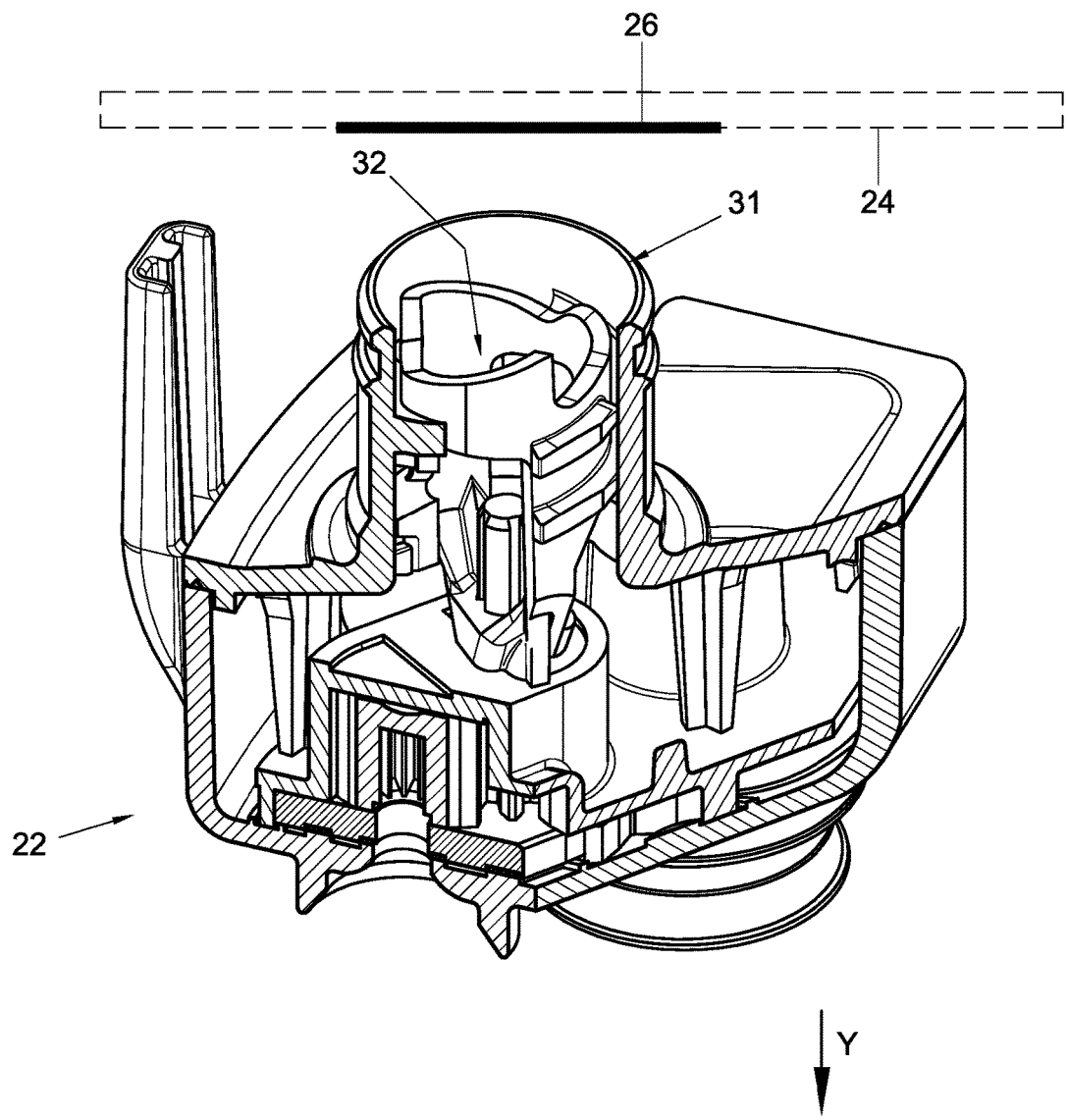
FIG. 12 illustrates a worked open tilted view of a dosing pump in an embodiment of the system according to the present invention.
Figure 13:
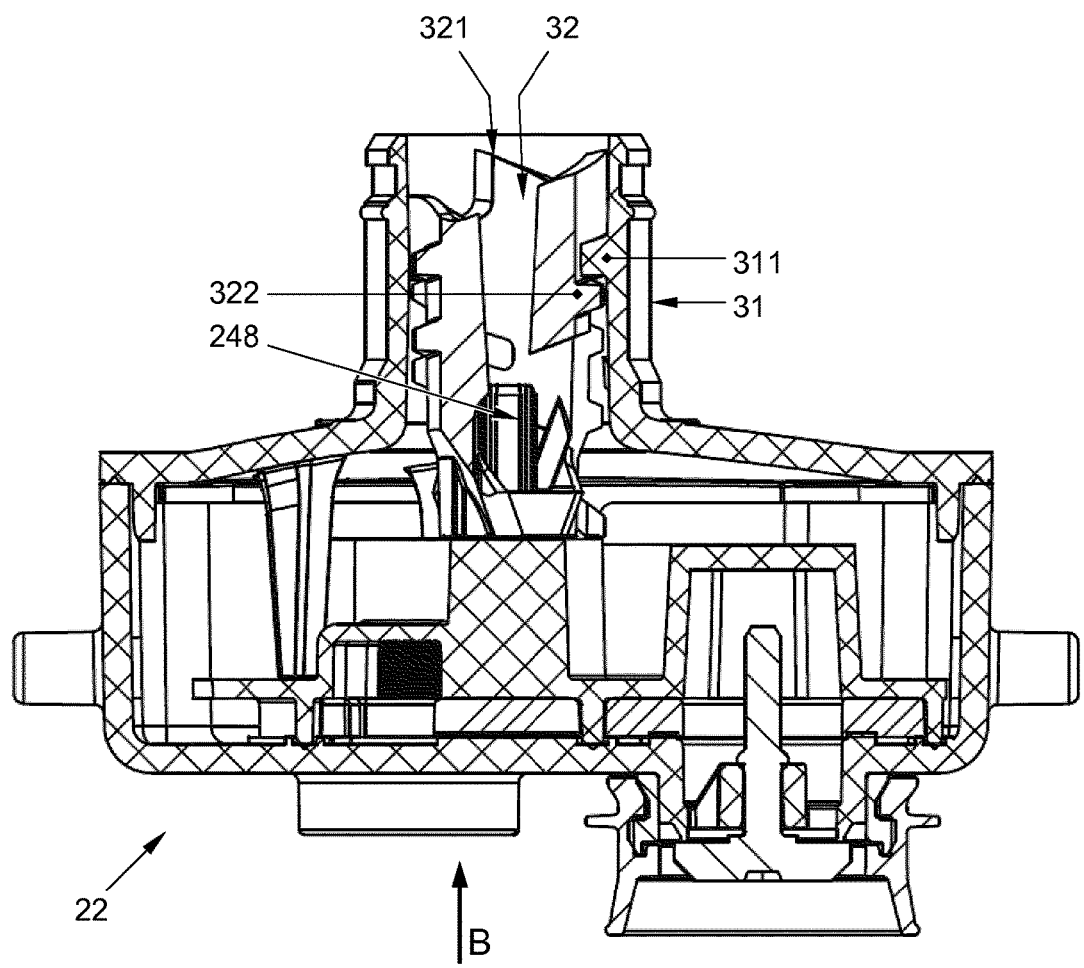
FIG. 13 illustrates a cross-section of the dosing pump of FIG. 12, the dosing pump being in a first operational state ST1.
Figure 13A:
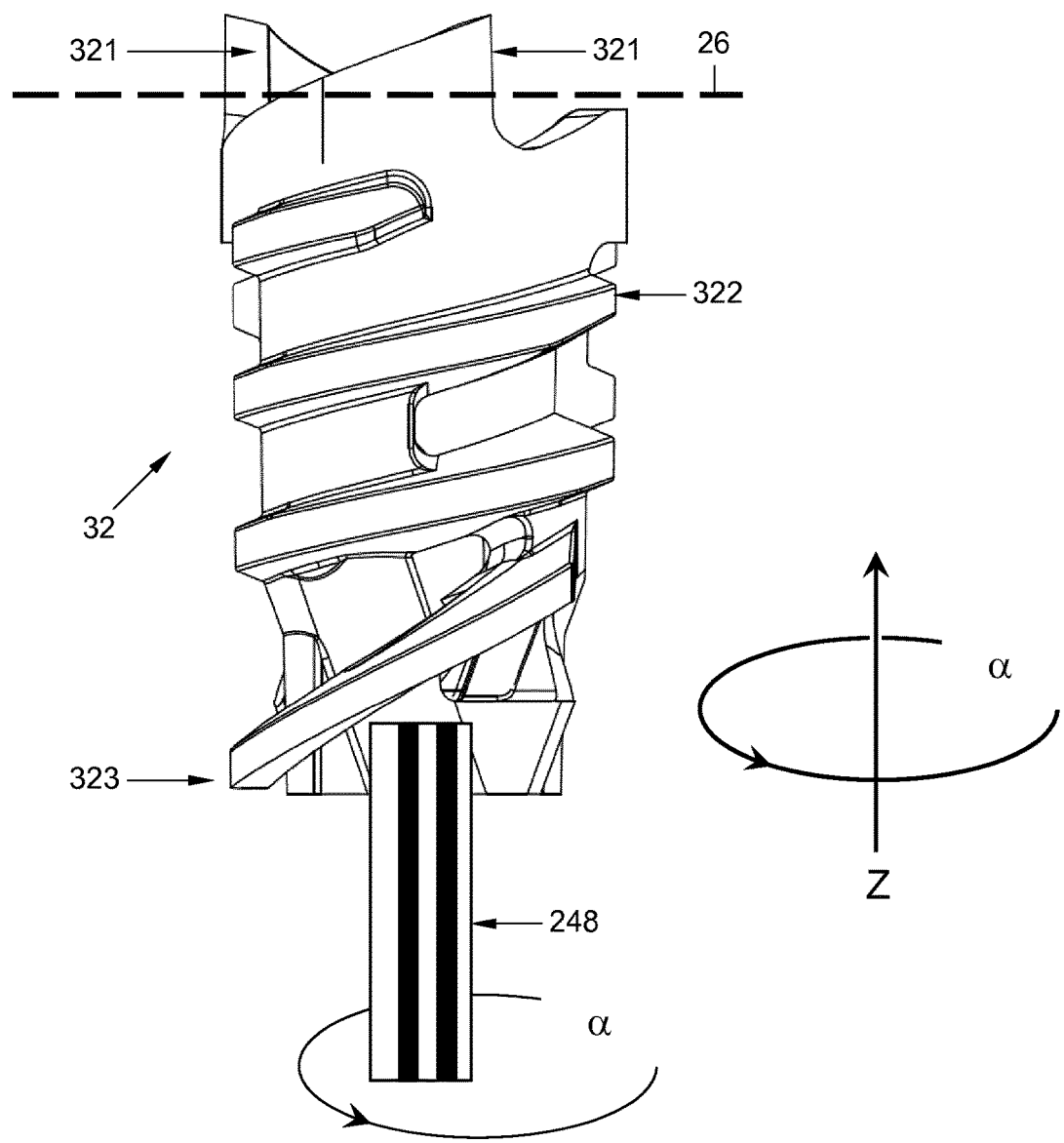
FIG. 13A illustrates a part of the dosing pump of FIG. 12.
Figure 13B:
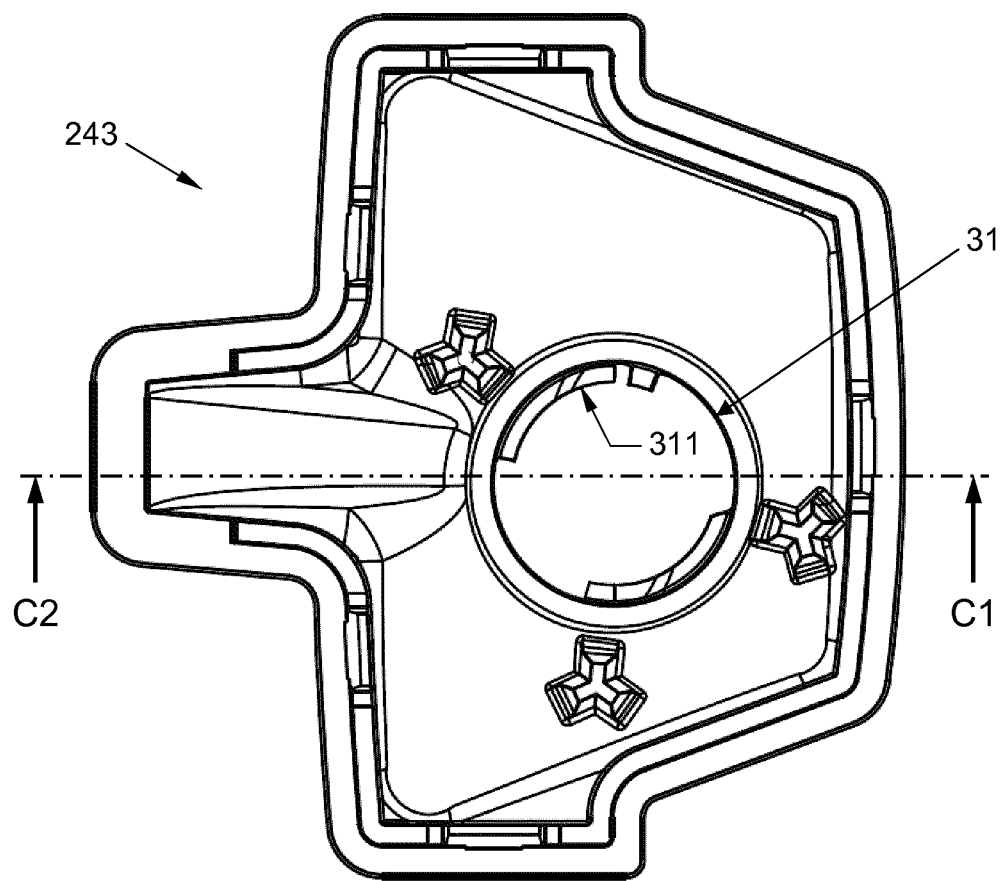
FIG. 13B illustrates another part of the dosing pump according to view B in FIG. 13.
Figure 13C:
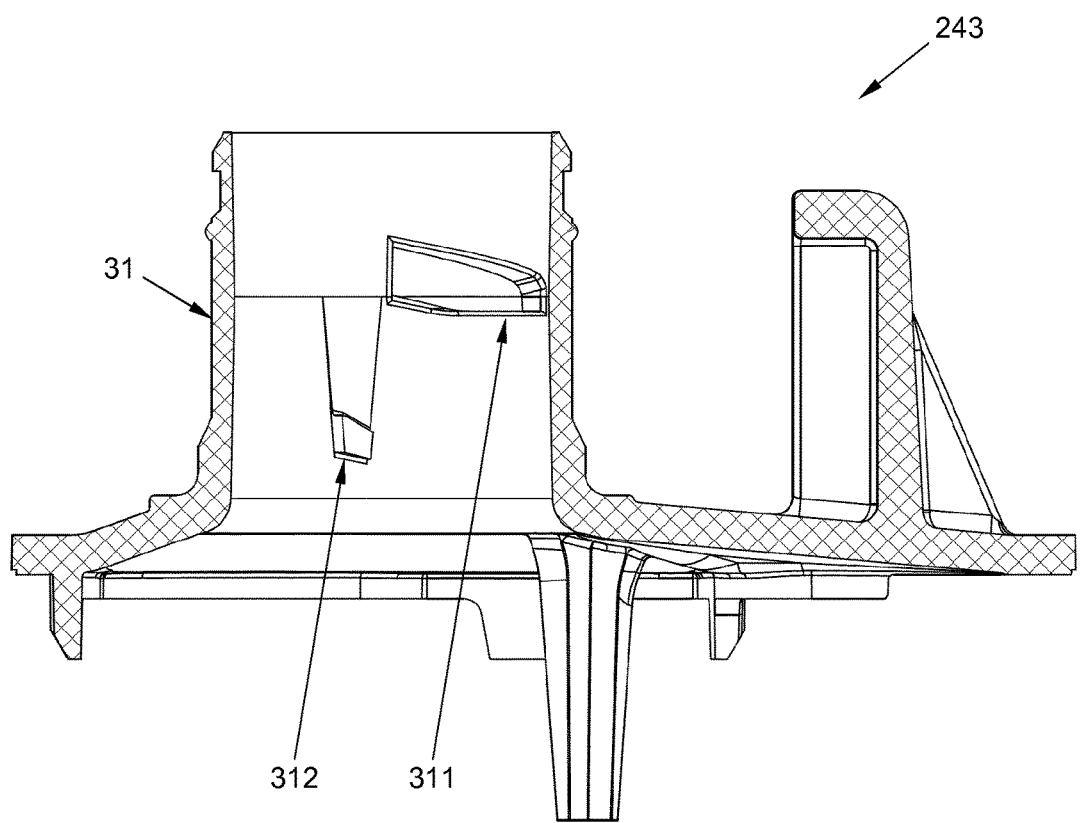
FIG. 13C illustrates a cross-section of said another part according to C1-C2 in FIG. 13B.

In an embodiment as shown in FIGS. 12 and 13, the dosing pump 22 used with the container 24 comprises a tubular conduit 31 from the container 24 to the dosing pump 22. Arranged inside the tubular conduit 31 is a rotatable piercing element 32 (See FIG. 7) with tooth shaped elements 321 facing the container 24 (schematically indicated by dotted lines). The seal 26 to be pierced is indicated schematically by a solid line. The rotatable piercing element 32 is also shown separately in FIG. 13A, and the tubular conduit 31 is shown separately in FIGS. 13B and 13C. Therein FIG. 13C illustrates a cross-section of said another part according to C1-C2 in FIG. 13B. The rotatable piercing element has an outer profile 322 that cooperates with an inner profile 311 of the tubular conduit to define an axial position (z) of said rotatable piercing element 32 dependent on its angular position ($\alpha$), wherein said rotatable piercing element at least has a first state ST1 as shown in FIGS. 12, 13, and 13A wherein it is angularly coupled to a rotatable element of said dosing pump 22. In this embodiment the rotatable element of the dosing pump 22 to which the rotatable piercing element 32 is coupled is a shaft 248 protruding from a secondary gear 247 of the pump. As, in the beverage dispensing system, the protruding shaft 248 is mechanically coupled with the drive shaft 13 that drives the dosing pump, a single motor 12 can be used to pierce the seal 26 to the container and to drive the dosing pump 22 for subsequent normal use.

As can be seen in FIGS. 13 and 13A, the rotatable piercing element 32 has a further outer profile 323. As can best be seen in FIG. 13C, the tubular conduit 31 has a further inner profile 312 that cooperates with the further outer profile 323 of the rotatable piercing element 32. The outer profile 322 and the further outer profile 323 of the rotatable piercing element 32 are formed as a helical thread, wherein the helical thread 323 has a larger pitch than the helical thread 322.

During execution of step S2 in the embodiment as described with reference to FIGS. 5 and 6, the drive shaft 13 is driven by motor 12. Via the mechanical coupling between the gears 245, 247 and the protruding shaft 248 this results in a rotating movement of the piercing element 32. As the piercing element 32 can freely shift in an axial direction along the protruding shaft 248, the engagement between the helical thread 322 of the piercing element 32 and the inner profile 311 has the effect that the rotatable piercing element 32 combines a rotating movement in the direction $\alpha$ around this axis z with an axial displacement in that direction z. Therewith the seal 26 is protruded to provide a channel for the liquid substance from the container 24 via the conduit 31 to the dosing pump 22. During the execution of step S2, the rotational speed may be relatively low as compared to the rotational speed used to dose a liquid substance. For example the rotational speed in step S2 may be in the range of 0.2 to 0.5 times the rotational speed used for dosing. By way of example the rotational speed in step S2 is about 200 rpm, whereas the rotational speed used when dosing is 600 rpm.

Figure 14:
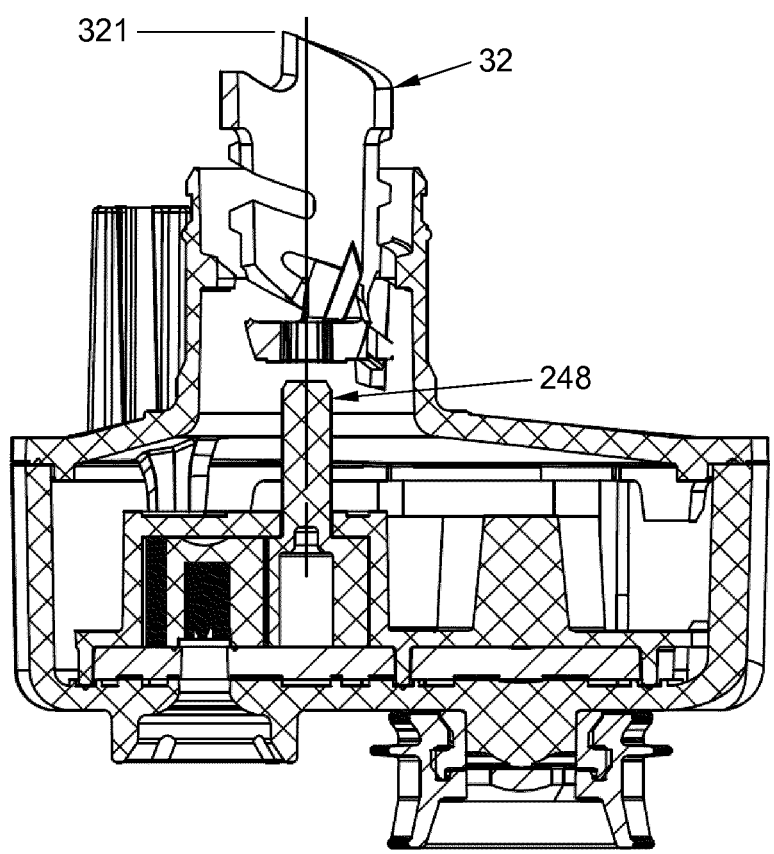
FIG. 14 illustrates a cross-section of the dosing pump of FIG. 12, the dosing pump being in a second operational state ST2.

Due to the axial displacement of the piercing element 32 occurring during the execution of step S2 the helical thread 323 engages the further inner profile 312 of the conduit 31. As the helical thread 323 has a relatively large pitch the piercing element 32 is now accelerated in the axial direction z until it releases the protruding shaft 248. Due to its inertness the piercing element continues its displacement for a moment until it is blocked in both directions by a blocking element (not shown). Therewith the rotatable piercing element 32 has assumed a second state ST2, as shown in FIG. 14, wherein it is decoupled from the protruding shaft 248.

Due to air present in the dosing pump 22, the liquid substance 25 will typically not flow spontaneously inside the dosing pump. Accordingly, in the embodiment shown in FIG. 5, the dosing pump is initially driven in step S3 before actually determining if liquid substance has entered the dosing pump. Driving the dosing pump 22 in step S3 creates an under pressure inside the pump and the conduit towards the pump that facilitates the flow of liquid. Alternatively the activation procedure AP may start immediately after the exchangeable supply pack in step S2. In that case a longer time-out period or a larger maximum number of iterations may be selected if step S7 is performed to take into account that no under pressure was created yet at the start of the activation procedure AP.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention.

As will be apparent to a person skilled in the art, the elements listed in the system and device claims are meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In the system claims enumerating several means, several of these means can be embodied by one and the same item of hardware. 'Computer program product' is to be understood to mean any software product stored on a computer-readable medium, such as a floppy disk, downloadable via a network, such as the Internet, or marketable in any other manner.

It will be understood that, although the terms first, second, third etc. may be used herein to describe various elements, components, modules and/or units, these elements, components, modules and/or units should not be limited by these terms. These terms are only used to distinguish one element, component, module and/or unit from another element, component, module and/or unit. Thus, a first element, component, module and/or unit discussed herein could be termed a second element, component, module and/or unit without departing from the teachings of the present invention.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

The invention claimed is:

1. A beverage dispensing system comprising:
at least one exchangeable supply pack, wherein each exchangeable supply pack comprises a single dosing pump and a single container with a liquid substance, the dosing pump and container of each exchangeable supply pack being structurally integrated for simultaneous placement in a beverage dispensing machine,
a beverage dispensing machine configured to receive the at least one exchangeable supply pack,
wherein the beverage dispensing machine comprises a controller for controlling the dosing pump of the at least one exchangeable supply pack after placement, and an inlet to receive liquid substance delivered by the dosing pump from the container,
the beverage dispensing system comprising a first detection facility configured to detect presence of liquid substance in the dosing pump of a placed exchangeable supply pack, and a second detection facility configured to detect the placement of an exchangeable supply package, wherein the controller is coupled to said first and said second detection facility and being operable in at least one of a start-up mode and a subsequent normal operation mode, the controller being arranged to assume said start-up mode in response to a signal from said second detection facility indicating the placement of an exchangeable supply package, in which start-up mode the system is arranged to perform an activation procedure wherein an activation cycle is repeated comprising activating the dosing pump of a placed exchangeable supply pack during a first period of time and subsequently maintaining the pump in an at least partially deactivated state during a second period of time, and wherein upon detection by said first detection facility that liquid substance is present within the dosing pump of a placed exchangeable supply pack, said controller is arranged to complete the start-up mode.

2. The beverage dispensing system according to claim 1, wherein the repeating of the activation cycle is preceded by a broaching step and wherein the exchangeable supply pack includes a piercing element to perform said broaching step.

3. The beverage dispensing system according to claim 2, wherein the exchangeable supply pack comprises a conduit from the container to the pump, having the piercing element rotatable arranged therein, the piercing element having tooth shaped elements facing the container to perform the broaching step, the rotatable piercing element having an outer profile that cooperates with an inner profile of the conduit to define an axial position of said rotatable piercing element dependent on its angular position, wherein said rotatable piercing element at least has a first state wherein it is angularly coupled to a rotatable element of said dosing pump.

4. The beverage dispensing system according to claim 3, wherein said rotatable piercing element has a second state wherein it is decoupled from said rotatable element.

5. The beverage dispensing system according to claim 1, wherein the controller has a detection facility to detect if a duration of said start-up mode exceeds a predetermined duration and/or to detect if a number of times that said activation cycle is repeated exceeds a predetermined number of times and to issue a detection signal upon such detection.

6. The beverage dispensing system according to claim 1, wherein said dosing pump is a volumetric pump.

7. The beverage dispensing system according to claim 6, wherein said volumetric pump is a gear pump.

8. The beverage dispensing system according to claim 1, wherein a buffer space is provided outside said container, and wherein said controller is arranged to perform a buffering step wherein said dosing pump is activated to fill said buffer with liquid substance from said container.

9. The system according to claim 1, wherein the exchangeable supply pack, including the dosing pump and the container, is configured for insertion into the beverage dispensing machine.

10. The system according to claim 1, wherein the system is arranged to perform the activation procedure only when the first detection facility has not detected presence of liquid substance in the dosing pump of a properly placed exchangeable supply package.

11. The system according to claim 1, wherein the at least one exchangeable supply pack comprises:
a first exchangeable supply pack comprising a first dosing pump and a first container with a liquid substance, and
a second exchangeable supply pack comprising a second dosing pump and a second container with a liquid substance,
wherein the beverage dispensing machine is configured to receive both the first exchangeable supply pack and the second exchangeable supply pack,
wherein the first exchangeable supply pack is independently removable from the beverage dispensing machine with respect to removing the second exchangeable supply pack from the beverage dispensing machine.

12. The system according to claim 1, wherein the first detection facility includes a transmitter for emitting radiation and a first detector for detecting radiation, wherein the exchangeable supply pack includes a first substantially transparent element which in use is positioned between the transmitter and the first detector.

13. The system according to claim 12, wherein the second detection facility includes the transmitter for emitting radiation and a second detector for detecting radiation, wherein the exchangeable supply package has a portion that is located between the transmitter and the second detector when the exchangeable supply package is placed in the beverage dispensing machine.

14. The system according to claim 13, wherein the portion of the exchangeable supply pack that is located between the transmitter and the second detector blocks transmission of radiation from the transmitter to the second detector, when the exchangeable supply package is placed in the beverage dispensing machine.

15. A beverage dispensing system comprising:
at least one exchangeable supply pack, wherein each exchangeable supply pack comprises a single dosing pump and a single container with a liquid substance, the dosing pump including a housing that is immovably attached to the container;
a beverage dispensing machine configured to receive the at least one exchangeable supply pack;
wherein the beverage dispensing machine comprises a controller for controlling the dosing pump of the at least one exchangeable supply pack after placement, and an inlet to receive liquid substance delivered by the dosing pump from the container,
the beverage dispensing system comprising a first detection facility configured to detect presence of liquid substance in the dosing pump of a placed exchangeable supply pack, and a second detection facility configured to detect the placement of an exchangeable supply package, wherein the controller is coupled to said first and said second detection facility and being operable in at least one of a start-up mode and a subsequent normal operation mode, the controller being arranged to assume said start-up mode in response to a signal from said second detection facility indicating the placement of an exchangeable supply package, in which start-up mode the system is arranged to perform an activation procedure wherein an activation cycle is repeated comprising activating the dosing pump of the placed exchangeable supply pack during a first period of time and subsequently maintaining the pump in an at least partially deactivated state during a second period of time, and wherein upon detection by said first detection facility that liquid substance is present within the dosing pump of the placed exchangeable supply pack, said controller is arranged to complete the start-up mode.

* * * * *